(12) United States Patent
Koeder et al.

(10) Patent No.: US 8,763,721 B2
(45) Date of Patent: Jul. 1, 2014

(54) ELECTRICAL MACHINE TOOL

(75) Inventors: Thilo Koeder, Gerlingen (DE); Joachim Platzer, Remseck-Hochberg (DE)

(73) Assignee: Robert Bosch GmbH, Stuttgart (DE)

( * ) Notice: Subject to any disclaimer, the term of this patent is extended or adjusted under 35 U.S.C. 154(b) by 396 days.

(21) Appl. No.: 12/736,695

(22) PCT Filed: Apr. 21, 2009

(86) PCT No.: PCT/EP2009/054755
§ 371 (c)(1),
(2), (4) Date: Nov. 1, 2010

(87) PCT Pub. No.: WO2009/132993
PCT Pub. Date: Nov. 5, 2009

(65) Prior Publication Data
US 2011/0042115 A1 Feb. 24, 2011

(30) Foreign Application Priority Data
Apr. 30, 2008 (DE) .......... 10 2008 001 479

(51) Int. Cl.
*B25F 5/00* (2006.01)

(52) U.S. Cl.
USPC ............ 173/20; 173/2; 173/171; 30/392; 83/13; 83/520

(58) Field of Classification Search
USPC .......... 173/20, 2, 217, 171; 83/746, 940, 941, 83/368, 371, 365, 451, 295; 118/668, 669; 219/124.1, 124.34; 30/392, 393; 356/614
See application file for complete search history.

(56) References Cited

U.S. PATENT DOCUMENTS

| | | | | |
|---|---|---|---|---|
| 4,200,015 A * | 4/1980 | Gerber | ............................... | 83/22 |
| 4,305,128 A * | 12/1981 | Manabe et al. | ............... | 700/160 |
| 4,513,381 A * | 4/1985 | Houser et al. | ................. | 700/168 |
| 4,621,185 A * | 11/1986 | Brown | ..................... | 219/124.34 |
| 4,628,459 A * | 12/1986 | Shinohara et al. | ............ | 700/173 |
| 4,737,614 A * | 4/1988 | Richardson | .............. | 219/130.01 |
| 4,833,782 A * | 5/1989 | Smith | ............................ | 30/392 |
| 5,010,652 A * | 4/1991 | Miletich | ........................ | 30/393 |
| 5,791,215 A * | 8/1998 | Morrison et al. | ................. | 83/13 |
| 6,619,168 B2 * | 9/2003 | Alsten et al. | ....................... | 83/13 |
| 7,140,283 B2 * | 11/2006 | Alsten et al. | ....................... | 83/13 |
| 7,346,406 B2 * | 3/2008 | Brotto et al. | ..................... | 700/83 |
| 7,373,866 B2 * | 5/2008 | Ushiwata et al. | .............. | 83/520 |
| 7,513,047 B2 * | 4/2009 | Wu | ................................... | 30/392 |
| 7,593,118 B2 * | 9/2009 | Tropf | ............................ | 356/614 |
| 8,033,026 B2 * | 10/2011 | Gibbons et al. | ................. | 30/371 |
| 2003/0226438 A1 * | 12/2003 | Adams | ............................ | 83/746 |
| 2007/0236565 A1 * | 10/2007 | Tropf | ............................. | 348/86 |

FOREIGN PATENT DOCUMENTS

DE  20 2004 005 478 U1  8/2004
WO  2004/069541 A1  8/2004

OTHER PUBLICATIONS

Bovik, Al, Editor, Handbook of Image and Video Processing, Gradient and Laplacian-Type Edge Detection, 2000, pp. 415-423, Academic Press, San Diego, CA, US.

* cited by examiner

*Primary Examiner* — Scott A. Smith
(74) *Attorney, Agent, or Firm* — Maginot, Moore & Beck

(57) ABSTRACT

The invention relates to an electrical machine tool, particularly a hand machine tool, having a contrast detection device, an analysis unit, and at least one sensor provided for capturing a surface of a work piece. According to the invention, the analysis unit is provided for detecting a differentiation of the surface from an at least partially automatic guide using data captured by a sensor.

20 Claims, 3 Drawing Sheets

ELECTRICAL MACHINE TOOL

CROSS-REFERENCE TO RELATED APPLICATION

This application is a 35 USC 371 application of PCT/EP2009/054755 filed on Apr. 21, 2009.

BACKGROUND OF THE INVENTION

Field of the Invention

An electric power tool with a device for detecting a surface of a work piece is already known.

The invention relates to an electrical machine tool, particularly a hand machine tool.

DESCRIPTION OF THE PRIOR ART

Advantages and Summary of the Invention

The present invention proposes an electric power tool, in particular a hand-held power tool, equipped with a contrast detection device that has an evaluation unit and at least one sensing device that is provided for detecting a surface, in particular of a work piece; the evaluation unit is provided to detect a differentiation of the surface based on data detected by the sensing means for an at least partially automatic guidance. In this context, "provided" should be understood to mean specially designed and/or specially embodied and/or specially programmed. In addition, an "evaluation unit" should in particular be understood to be a unit that can be composed of a control unit, a processing unit, a control device, and/or a regulating unit; the evaluation unit can be composed of a processor and/or a microcontroller alone and can also be composed of a processor and/or a microcontroller as well as other electronic components such as a storage means. In addition, a "differentiation of a surface" should in particular be understood to be a distinguishing between at least two regions of the surface based on a contrast and/or a wavelength difference so as to recognize light and dark regions or different-colored regions of the surface. In this context, a "contrast" should in particular be understood to be a distinguishing feature for a brightness gradient and/or color gradient of an image or between two pixels, in particular image signals or pixels of the image detected by the sensing device; preferably, the contrast or a difference in the brightness gradient can be detected for the evaluation unit. The embodiment according to the invention can be advantageously used to detect a line provided on a surface of a work piece to be machined—preferably a line that is of a different color than the surface such as a light or white line on a dark or black surface, etc.—through differentiation of the surface of the work piece. In addition, this can be used in a particularly advantageous fashion to achieve an at least partially automatic line tracking of the electric power tool, namely in that the electric power tool, preferably controlled by a guide unit, automatically follows a curve of the line detected by the contrast detection device.

The electric power tool with the contrast detection device can basically be embodied in the form of any electric power tool deemed suitable by the person skilled in the art, in which an at least partial contrast detection of a work piece surface and/or an at least partially automatic tracking of a line is advantageous. It is particularly advantageous, though, for the electric power tool to be a hand-held power tool—in particular a hand-held power tool provided for sawing and/or cutting and/or grinding such as a jigsaw, a hand-held circular saw, etc.—in which it is desirable for the hand-held power tool to be guided along a line, in particular along a line provided on a surface of the work piece.

According to another proposal, the contrast detection device for a contrast measurement is provided before at least one operating mode of a motor and/or tool. In this context, "before" should in particular be understood to mean that particularly in an individual work procedure, a first action, in particular a contrast measurement, occurs chronologically before a second action, in particular an operating mode of the motor and/or tool. Preferably, in at least one sequence, a successful contrast measurement can be a requirement for an operating mode of the motor and/or tool, i.e. in particular, only after a successful contrast measurement can the motor be started and/or a machining procedure of the work piece with the tool be carried out. A contrast measurement can advantageously take place before the start of work with the electrical appliance and it is possible to effectively measure a contrast while avoiding interference influences such as work remnants and/or dust, and thus to advantageously prevent undesirable malfunctions in the contrast measurement, for example during a work procedure.

According to another proposal, the contrast detection device has at least one illumination device provided for illuminating a measurement region. The illumination device here can enhance a differentiation of the surface or augment a contrast of a line, thus facilitating a contrast detection in the contrast detection unit and in the evaluation unit. This also makes it possible to advantageously minimize undesirable external influences, e.g. a disadvantageous casting of shadow by external lighting, during the contrast measurement. The illumination device is preferably embodied in the form of a spectral illumination device such as an infrared light emitting diode and/or another illumination means deemed suitable by the person skilled in the art.

A structurally simple, particularly cost-saving contrast measurement can be achieved if the sensing device is at least partially composed of a camera. A "camera" should in particular be understood here to be a sensing device that is provided for sensing or detecting static and/or moving images, in particular of the surface of the work piece. Basically, however, it is also possible for the sensing device to be composed of another device that the person skilled in the art deems suitable for performing a contrast measurement.

A structurally simple, particularly cost-saving contrast measurement can be achieved if the sensing means is at least partially composed of a camera. A "camera" should in particular be understood here to be a sensing means that is provided for sensing or detecting static and/or moving images, in particular of the surface of the work piece. Basically, however, it is also possible for the sensing means to be composed of another means that the person skilled in the art deems suitable for performing a contrast measurement.

According to another proposal, the contrast detection device has at least one filter element for selecting at least one measurement signal, thus making it possible in particular for a sensitivity to a measurement signal for the contrast measurement to be limited to a specified spectral range. In addition, this can advantageously separate the measurement signal out from undesired interference signals. In this context, a "filter element" should in particular be understood to be an optical filter element that is preferably permeable only for a limited spectral range.

According to another proposal, the evaluation unit has at least one differentiation device for detecting a contrast, by means of which a contrast change in the sensed surface can be detected or ascertained in a particularly simple way, structurally, namely in that the differentiation device differentiates the sensed measurement signal by producing a differential quotient, thus making it possible to detect changes in the signal waveform in a particularly simple and reliable way. In this context, a "differentiation device" should in particular be understood to be an electronic, preferably analog, component in which an input signal is converted through differentiation, in particular in order to detect fluctuations and/or changes in the input signal or contrast signal as a function of a differentiation parameter. The differentiation device here can be composed of an operational amplifier, an analog processor of a microcontroller, and/or other analog components and/or software program components deemed suitable by the person skilled in the art.

According to another proposal, the contrast detection device has at least one adjusting device that is provided for an adjustment to a threshold value for at least one contrast parameter. This makes it advantageously possible to adapt a contrast detection to a color gradient and/or brightness gradient of the surface. The adjusting means in this case can be composed of a manual adjusting device for a manual adjustment of the threshold value by the operator and/or composed of an adjusting device for an at least partially automatic adjustment, preferably controlled by the evaluation unit. The adjusting device in this case can be composed of a digital/analog converter and/or other components deemed suitable by the person skilled in the art.

In another proposed embodiment of the invention, a contrast detection device for an electric power tool, in particular a hand-held power tool, is equipped with a contrast detection device that is provided to carry out a contrast measurement for an at least partially automatic guidance of the electric power tool; in at least one contrast detection mode, a contrast measurement of a surface of a work piece is carried out. This can be a detection of a line provided on a surface of a work piece to be machined—for example a light or white line on a dark or black surface, etc.—in the contrast detection mode of the contrast detection device. A "contrast detection mode" should in particular be understood here to be an operating mode of the contrast detection device for carrying out a contrast measurement.

In a particularly advantageous embodiment, in the contrast detection procedure, the contrast detection mode of the contrast detection device takes place before at least one operating mode of a motor and/or tool of the electric power tool. It is thus advantageously possible to carry out a contrast measurement before beginning work with the electrical appliance and to effectively measure a contrast while avoiding interference influences such as work remnants and/or dust.

According to another proposal, an illumination parameter, in particular a spectral illumination parameter, is adjusted in the contrast detection mode, making it possible to augment a contrast of a line, thus facilitating a contrast measurement or contrast detection. It is also possible to advantageously minimize undesirable external influences, e.g. a disadvantageous casting of shadow by external lighting, during the contrast measurement.

According to another proposal, at least one contrast parameter is determined by producing a differential quotient of at least one sensed measurement signal, making it possible in a particularly simple way, structurally, to detect or ascertain a contrast change in the sensed surface in that the differentiation device differentiates the sensed measurement signal by producing a differential quotient, thus making it possible to detect changes in the signal waveform in a particularly simple and reliable way. In this connection, a "contrast parameter" should in particular be understood to be a parameter that reproduces a contrast gradient or a change in the brightness gradient of an image.

An advantageous contrast detection that is adapted to a color gradient and/or brightness gradient of the surface can be achieved by adjusting a threshold value for a contrast measurement.

In a particularly advantageous fashion, in at least one contrast detection mode, the curve of a line on the surface of a work piece is detected for an at least partially automatic guidance of the electric power tool, in particular making it possible to achieve an at least partially automatic guidance of the electric power tool and thus a high degree of operating convenience for an operator.

According to another proposal, a contrast parameter of the contrast measurement is used to adjust the sensing device, in particular the camera, making it possible to achieve an advantageous adaptation and/or adjustment of the sensing device, in particular for adapting and/or adjusting a sensor parameter, in order to detect the contrast before and/or during a contrast measurement. Preferably, the adaptation and/or adjustment of the sensor parameter of the sensing device adjusts and/or adapts in particular an amplification factor such as a gain factor and/or white balance of the sensing device. In a particularly advantageous fashion, the adaptation and/or adjustment of the sensing device occurs in an automated fashion, preferably controlled by the evaluation unit.

According to another proposal, at least one information parameter of the contrast measurement is output to an operator. In this context, an "information parameter" should in particular be understood to be a parameter that contains information, in particular a current status, about a contrast operating mode and/or a contrast measurement of the contrast detection device. For this purpose, the contrast detection device or the electric power tool is advantageously equipped with an output unit for outputting the information parameter. This embodiment permits an operator to advantageously access a current status of a contrast measurement. Moreover, if the contrast ratios are insufficient for a differentiation of the surface of the work piece to be machined, the operator of the electrical appliance can be informed of this before starting work.

BRIEF DESCRIPTION OF THE DRAWINGS

Other advantages ensue from the following description of the drawings. The drawings show an exemplary embodiment of the invention. The drawings, the description, and the claims contain numerous features in combination. The person skilled in the art will also suitably consider the features individually and unite them in other meaningful combinations.

DESCRIPTION OF THE PREFERRED EMBODIMENT

Figure 1:
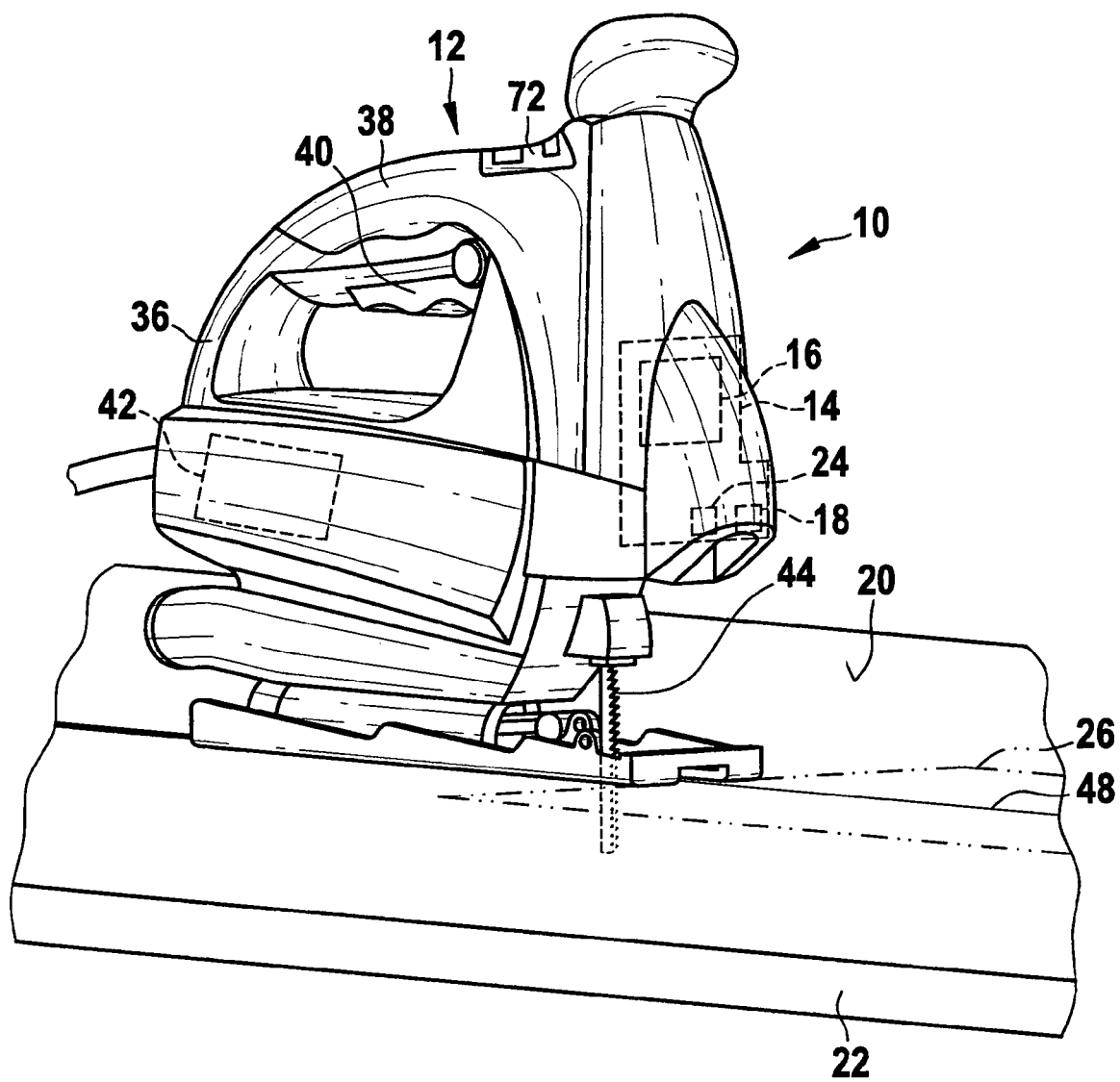
FIG. 1 is a schematic view of an electric power tool that is embodied in the form of a jigsaw and equipped with a contrast detection device.

FIG. 1 shows an electric power tool 10 according to the invention, depicted in the form of a hand-held power tool 12.

The hand-held power tool 12 is embodied in the form of a jigsaw. Basically, the hand-held power tool 12 could also be embodied in the form of another hand-held power tool 12 or electric power tool 10 deemed suitable by the person skilled in the art, such as a hand-held circular saw, etc. The hand-held power tool 12 has a housing 36 with a handle region 38 and a switch element 40 for switching the hand-held power tool 12 on and off. The housing 36 of the hand-held power tool 12 contains a motor unit 42 that drives a tool 44 via a motor shaft, not shown in detail, and a transmission, not shown in detail. The hand-held power tool 12 also has a contrast detection device 14 with an evaluation unit 16 and a sensing means 18, which is provided to detect a surface 20 of a work piece 22 to be machined. The evaluation unit 16 in this case is provided to detect a differentiation of the surface 20 in the form of a contrast and/or a wavelength difference based on data detected by the sensing means 18 for an at least partially automatic guidance of the hand-held power tool 12. In this case, a contrast measurement of the surface 20 of the work piece 22 is carried out in at least one contrast detection mode KM1.

Figure 2:
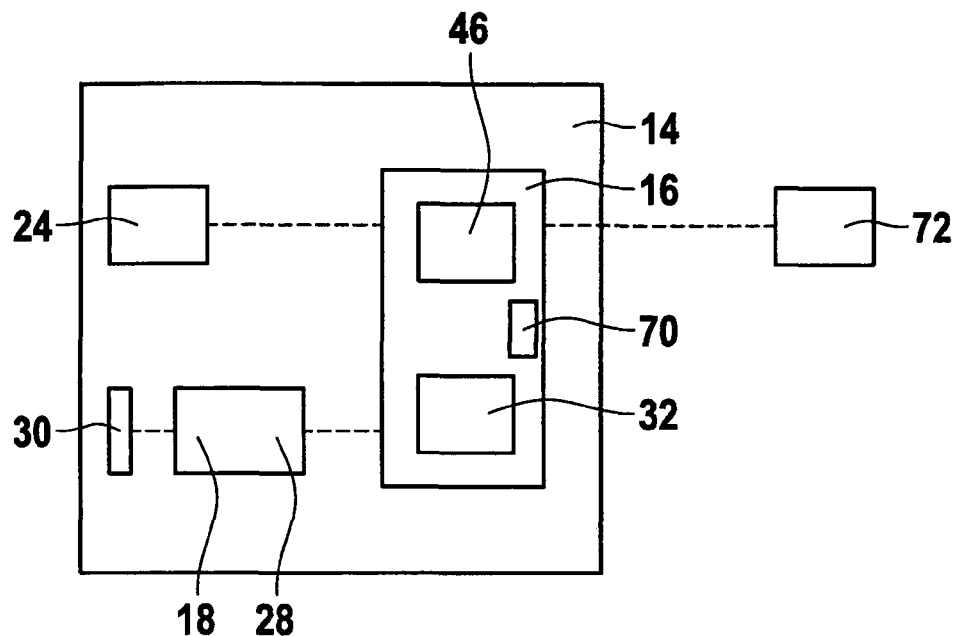
FIG. 2 is a schematic depiction of the contrast detection device.
Figure 3:
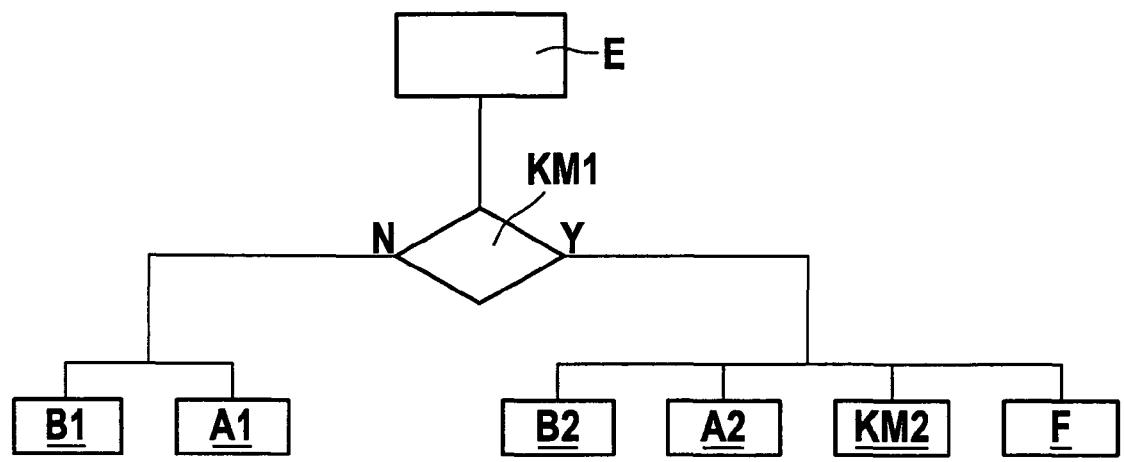
FIG. 3 is a schematic depiction of a process sequence of a contrast measurement.

FIG. 2 is a schematic depiction of the contrast detection device 14. In addition to the evaluation unit 16 and the sensing means 18 embodied in the form of a camera 28, the contrast detection device 14 also has an illumination means 24 and a filter element 30. The illumination means 24 is provided for illuminating a measurement region 26 in a contrast detection mode and the filter element 30 is provided for selecting a measurement signal. To this end, the filter element 30 is situated in front of the sensing means 18 along a signal path leading into the sensing means 18. In addition, the contrast detection device 14 contains a differentiation means 32, which is for detecting a contrast and is contained in the evaluation unit 16, and a microcontroller 46 and contained in the evaluation unit 16. To detect the surface 20 of the work piece 22, in the contrast detection device 14, a contrast measurement of an initial contrast detection mode KM1 is performed before an operating mode B1, B2 of an initial operation of the motor unit 42 and/or the tool 44 of the hand-held power tool 12 (FIG. 3) so that before work begins, a contrast measurement can be carried out to detect a guide line 48 provided on the surface 20.

Figure 4:
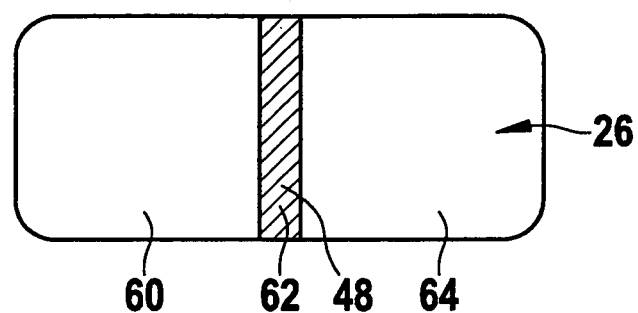
FIG. 4 is a partial view of a subregion of a surface of the work piece provided for a contrast measurement.

In this case, after a switching-on procedure E of the hand-held power tool 12, a contrast measurement takes place in the first contrast detection mode KM1 in that the sensing means 18, activated by the evaluation unit 16, senses the surface 20 of the work piece 22 or the measurement region 26 of its surface 20 (FIGS. 1 and 4). Then the sensed data are analyzed in the evaluation unit 16. The data sensed by the sensing means 18 are conveyed via an internal data line, not shown in detail, to the evaluation unit 16 and are processed there by the differentiation means 32. In the differentiation means 32, a measurement signal 50 of the sensing means 18 is used to produce a differential quotient. Then the measurement signal 50 of the differentiation means 32 is evaluated in the microcontroller 46.

In order to achieve an effective contrast measurement, the illumination means 24, which is embodied in the form of a spectral illumination means and is controlled by the evaluation unit 16, illuminates the measurement region 26 of the surface 20 of the work piece 22, thus increasing the contrast sharpness of the surface 20 or the contrast sharpness of the guide line 48 provided on the surface 20 in relation to the surface 20. The illumination means 24 is embodied in the form of an infrared light emitting diode. The evaluation unit 16 controls the illumination of the measurement region 26 by the illumination means 24. In so doing, the evaluation unit 16 adapts an illumination parameter of the illumination means 24 to a contrast gradient or brightness gradient of the measurement region 26 of the surface 20 detected by means of the sensing means 18 and the differentiation means 32. Also controlled by the evaluation unit 16, a contrast parameter determined during the contrast measurement is used to adjust the sensor unit, in particular to adjust a sensor parameter such as an amplification factor and/or white balance, thus adapting the sensed measurement signal 50 of the sensing means 18 or the camera 28 to a contrast gradient of the measurement region 26.

If a contrast detection by means of the contrast detection device 14 is unsuccessful, then the operator of the hand-held power tool 12 is provided with a first output A1 of an information parameter and the operator can start a normal operating mode B1 of the hand-held power tool 12 with a manual guidance. If a contrast detection by means of the contrast detection device 14 is successful, then the operator is notified of this by means of an output A2 of an information parameter, also enabling an operating mode B2 of the hand-held power tool 12 with a guidance mode F that provides an at least partially automatic guidance along the guide line 48. The successful contrast measurement is a requirement for the guidance mode F. Furthermore, at the same time as the operating mode B2 of the hand-held power tool 12, a second contrast detection mode KM2 carries out a continuous detection of the guide line 48.

The hand-held power tool 12 is equipped with an output unit 72 for outputting the information parameter of the contrast measurement. The output unit 72 includes an optical output means and an acoustic output means; the optical output means can output a guide line 48, which is detected by the contrast detection device 14, for the operator of the hand-held power tool 12 and the acoustic output means can output an error message if necessary. This is particularly important for the case in which the detection of the guide line 48 provided on the surface 20 is unsuccessful due to the presence of foreign matter and/or other interfering external influences, permitting this to be communicated to an operator before the work begins.

Figure 5:
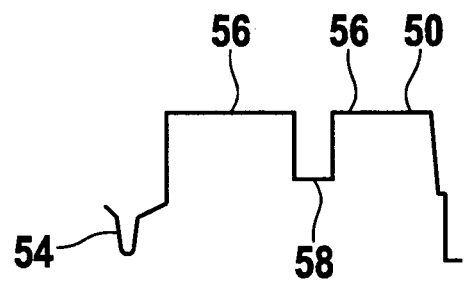
FIG. 5 shows a measurement signal detected by a sensor unit of the contrast detection device.

FIG. 5 depicts a sensed measurement signal 50 of the sensing means 18 embodied in the form of a video camera. In this case, a first downward-sloped signal region 54 is composed of a start signal for the differentiation means 32. The start signal is produced by a separate component that is not shown in detail. Different regions 60, 62, 64 with different brightness stages in the measurement region 26 on the surface 20 of the work piece 22 are described by different signal levels in the measurement signal 50 of the video camera. In the signal waveform shown in FIG. 5, a first region 60 with a light surface 20 of the work piece 22 from FIG. 4 is described by a high level 56 in the measurement signal 50. A second, dark region 62 composed of the provided guide line 48 (depicted with cross-hatching in FIG. 4) is described by a low level 58 in the measurement signal 50. A subsequent third, light region 64 of the surface 20 is once again described by a high level 56 in the measurement signal 50 of the video camera, analogous to the one from the first region 60. The measurement signal 50 of the video camera is supplied to the evaluation unit 16 and differentiated by the differentiation means 32, thus yielding a differential quotient of the measurement signal 50.

Figure 6:
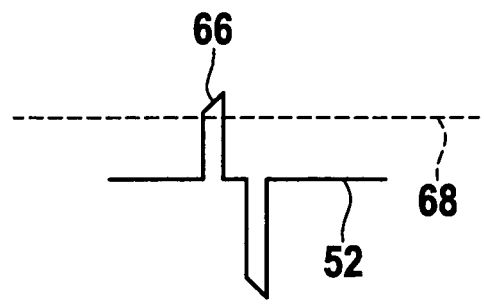
FIG. 6 shows a signal that a differentiation means has converted in order to determine a contrast.

FIG. 6 depicts a differentiated signal 52 of the differentiation means 32 or an output signal of the differentiation means 32. A change in the measurement signal 50 of the video camera results in a jump 66 in the curve of the differential quotient or of the differentiated signal 52; this jump 66 is due to an abrupt transition from the light region 60, 64 to the adjacent dark or black region 62 (FIG. 4). The curve of the signal 52 in the region of the jump 66 is produced by an unsteady function. A value of the differential quotient of the differentiated signal 52 is constituted by a contrast parameter.

An evaluation of the differentiated data from the differentiation means 32 is performed in the microcontroller 46 of the evaluation unit 16. To detect a clear contrast within the evaluation unit 16, a value of the differential quotient or of the contrast parameter must lie above an established threshold value 68. The contrast detection device 14 also has an adjusting means 70 that is provided for adjusting a threshold value 68 for at least one contrast parameter. The adjusting means 70 is contained in the evaluation unit 16. In addition, the adjusting means 70 is composed of an adjusting means 70 provided for a manual adjustment so that an operator can carry out an adaptation of the contrast detection during operation of the hand-held power tool 12. In another embodiment of the invention, it is essentially possible at any time for the adjusting means 70 to be controlled automatically by the evaluation unit 16. In this case, in the event of insufficient contrast ratios, an operator can use the adjusting means 70 to vary the threshold value 68 so that it is once again possible to carry out a contrast detection in the evaluation unit 16, e.g. in the case of a gray surface 20 with a guide line 48 that is a few gray levels darker or in the event of a slow transition occurring in gray stages from the surface 20 to the guide line 48; in this case, a signal change can be detected in the differentiation means 32 by a slight slope in the signal waveform. During such a variation, the threshold value 68 of the adjusting means 70 must always lie above an established minimum threshold.

The contrast measurement or a contrast detection process of the contrast detection device 14 is thus used to detect the guide line 48 along which the hand-held power tool 12 is to be guided during operation. To this end, the hand-held power tool 12 has a guidance unit, not shown in detail, which, during operation of the hand-held power tool 12, provides an at least partially automatic guidance of the hand-held power tool 12 along the guide line 48 on the surface 20 of the work piece 22 detected by means of the contrast detection device 14.

The foregoing relates to the preferred exemplary embodiment of the invention, it being understood that other variants and embodiments thereof are possible within the spirit and scope of the invention, the latter being defined by the appended claims.

The invention claimed is:

1. In an electric power tool, in particular a hand-held power tool, the improvement comprising:
   a contrast detection device including at least one sensing device provided to receive a light signal reflected from a surface of a work piece and operable to generate data corresponding to at least one optical characteristic of the reflected light signal, and an evaluation unit operable to detect a differentiation of the optical characteristic of the light signal reflected from the surface of the work piece based on data generated by the sensing device and operable to generate an information parameter indicative of such differentiation; and
   an output unit coupled to the contrast detection device operable to output the information parameter to the operator of the power tool.

2. The electric power tool as recited in claim 1, wherein the contrast detection device is provided for a contrast measurement before at least one operating mode of a motor and/or tool.

3. The electric power tool as recited in claim 2, wherein the contrast detection device has at least one illumination device that is provided for illuminating a measurement region and the reflected light signal includes reflected light from said illumination device.

4. The electric power tool as recited in claim 3, wherein the sensing device is at least partially composed of a camera.

5. The electric power tool as recited in claim 2, wherein the sensing device is at least partially composed of a camera.

6. The electric power tool as recited in claim 1, wherein the contrast detection device has at least one illumination device that is provided for illuminating a measurement region and the reflected light signal includes reflected light from said illumination device.

7. The electric power tool as recited in claim 6, wherein the sensing device is at least partially composed of a camera.

8. The electric power tool as recited in claim 1, wherein the contrast detection device has at least one filter element for selecting an optical characteristic as at least one measurement signal.

9. The electric power tool as recited in claim 1, wherein the evaluation unit has at least one differentiation device for detecting a contrast between the optical characteristics of the reflected signal at different locations on the surface of the workpiece.

10. The electric power tool as recited in claim 1, wherein the contrast detection device has at least one adjusting device that is provided for adjusting a threshold value for a contrast parameter for at least one optical characteristic.

11. A contrast detection device for an electric power tool comprising:
   at least one sensing device provided to detect light reflected from a surface of a work piece and operable to generate data corresponding to at least one optical characteristic of the light signal; and
   an evaluation unit operable to detect a differentiation of the optical characteristic of the light signal reflected from the surface of the work piece based on data generated by the sensing device and operable to generate an information parameter indicative of such differentiation; and
   an output unit coupled to the evaluation unit operable to output the information parameter to the operator of the power tool.

12. The contrast detection device for an electric power, in particular a hand-held power tool, as recited in claim 11, wherein the contrast detection device is provided to carry out a contrast measurement for use by the at least partially automatic guidance feature of the electric power tool, and in at least one contrast detection mode, a contrast measurement of a light signal reflected from a surface of a work piece is performed.

13. The contrast detection device as recited in claim 12, wherein the contrast detection mode of the contrast detection device occurs before at least one operating mode of a motor and/or tool of the electric power tool.

14. The contrast detection device as recited in claim 13, wherein an illumination parameter is adjusted in the contrast detection mode.

15. The contrast detection device as recited in claim 14, wherein at least one contrast parameter is determined by producing a differential quotient of at least one sensed measurement signal.

16. The contrast detection device as recited in claim 12, wherein an illumination parameter is adjusted in the contrast detection mode.

17. The contrast detection device as recited in claim 12, wherein at least one contrast parameter is determined by producing a differential quotient of at least one sensed measurement signal.

18. The contrast detection device as recited in claim 12, wherein a threshold value is adjusted for the contrast measurement.

19. The contrast detection device as recited in claim 12, wherein in at least one contrast detection mode, a curve of a guide line on a surface of a work piece is detected for use by the at least partially automatic guidance feature of the electric power tool.

20. The contrast detection device as recited in claim 12, wherein at least one contrast parameter of the contrast measurement is used for adjusting a sensor device.

\* \* \* \* \*